Figure 1:
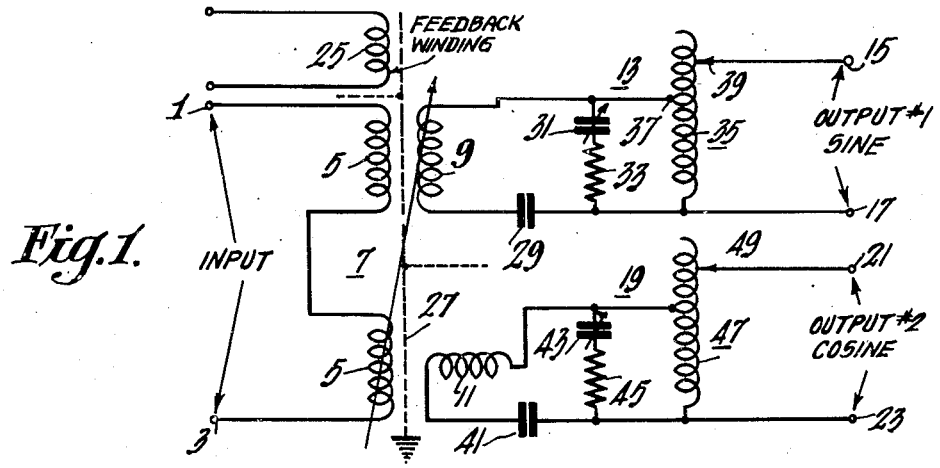

June 1, 1948. M. L. GREENOUGH 2,442,597
PHASE AND AMPLITUDE CONTROL CIRCUIT FOR ELECTRONIC FUNCTION GENERATORS
Filed Sept. 28, 1945 2 Sheets-Sheet 1

INVENTOR.
Maurice L. Greenough
BY
ATTORNEY

Patented June 1, 1948

2,442,597

UNITED STATES PATENT OFFICE 2,442,597

PHASE AND AMPLITUDE CONTROL CIRCUIT FOR ELECTRONIC FUNCTION GENERATORS

Maurice Leighton Greenough, Groveland, Mass., assignor to Radio Corporation of America, a corporation of Delaware Application September 28, 1945, Serial No. 619,238

6 Claims. (Cl. 178—44)

This invention relates generally to electronic function generators and more particularly to an improved output phase and amplitude correction circuit for a magnetic variocoupler arranged for controlling the phases and magnitudes of output voltages which are non-linear functions of an input voltage applied to said variocoupler.

In electronic computing systems for solving ballistic functions in the process of sighting a gun at a remote fixed or movable target, it is customary to derive the present slant range data by means of optical or radar sighting apparatus. The slant range data thus obtained are in polar coordinates which often must be converted into the rectangular or Cartesian coordinates representing present elevation and present ground range. In the case where the slant range tracking data is derived by radar apparatus, the slant range may be represented by an alternating voltage having a magnitude corresponding to the value of the slant range.

The instant invention comprises a phase correction circuit for a precision variocoupler wherein the alternating voltage having a magnitude corresponding to the value of the slant range is applied to a stator winding to establish a magnetic field having an intensity corresponding to the value of the slant range. A pair of mutually perpendicular rotor coils rotatable within the magnetic field provide output voltages having magnitudes corresponding to the sine and cosine, respectively, of the field energizing voltages. The rotor output voltage having a magnitude corresponding to the product of the sine of the angular rotation of the rotor and the magnitude of the stator energizing voltage is proportional to the value of the present elevation. The rotor output voltage corresponding to the product of the cosine of the angular rotation and the magnitude of the stator energizing voltage is proportional to the value of the present ground range.

Since ballistic functions must be solved with an extremely high degree of accuracy, it is essential that the derived sine and cosine function currents be extremely close approximations of the true sine and cosine function values, and that the phases of the derived currents bear predetermined relation to the phase of each other and the input current. It is also essential that current scale factors be precisely maintained.

Since mechanical and electrical limitations in the variocoupler inherently limit the accuracy with which such devices may be constructed, it is essential that auxiliary means must be included for correcting for distortion of the energizing magnetic field due to shielding effects, etc., in order that null current values may be obtained from the rotor windings with precisely 180° angular separation. Without such correction the null points may deviate from the 180° angular separation by several mils of angle even when great care is taken in construction and assembly of the variocoupler.

The invention contemplates the use of a variocoupler of the type described wherein the stator windings are designed to produce a substantially uniformly distributed magnetic field. The stator support comprises a pair of hemispherical insulating members each having a plurality of separate series-connected winding sections supported in slots on the external surfaces of the sphere, the density of the stator windings being substantially constant along the axis of the coil. The rotor windings are each wound in pairs of peripheral slots which are mutually perpendicular. In order to insure that the stator field may be accurately proportional in magnitude to the value of the energizing voltage, a plurality of feedback windings are wound in other peripheral slots on the stator support intermediate the several stator winding sections.

The method and means of employing the currents from the feedback winding to compensate for variations in the gain of the driving circuit and for the effects of resistance in the variocoupler windings is disclosed and claimed in the copending application of Arthur W. Vance, Serial No. 607,887, filed July 30, 1945, assigned to the same assignee as the instant application. In the device described in said copending application the stator is energized by signals derived from an input amplifier or other circuit, not shown, which is responsive to the present slant range alternating signal voltage. The feedback winding is connected through a variable phase control and a variable amplitude control to the input circuit of the amplifier in a manner whereby the amplifier input voltage and the feedback voltage are in phase opposition, and wherein the amplitude of the feedback voltage is but slightly less than the amplitude of the input voltage. Thus the flux density generated by the stator winding is substantially determined by the magnitude of the input voltage to the amplifier, and is almost independent of amplifier gain and the resistance of the field windings. The system thus described may be termed a "constant flux" feedback system wherein the output voltages derived from the rotor windings are substantially trigonometric functions of the input voltage magintudes, providing that the field and the rotor windings are properly oriented with respect to each other and to the respective winding axes and further providing that the shape of the field is not distorted by adjacent shields or other structure.

Since stator field distortion is inherent in all such devices it is essential that correcting means be provided for separating null current values in each of the rotor winding output circuits by angular values of exactly 180°. This feature is disclosed and claimed in applicant's copending U. S. application, Serial No. 619,239, filed September 28, 1945, which describes the use of separate angularly-adjustable, small correction coils which are serially-connected with the rotor windings and adjustably coupled to the stator field whereby the null current points in the rotor circuits may be adjusted to an angular separation of precisely 180° as the rotor windings are rotated.

The instant invention comprises a control circuit for each of the variocoupler rotor winding circuits for controlling the phases and amplitudes of the currents derived from each of the rotor windings. The inductive reactance of each rotor winding is neutralized by an equal series capacitive reactance, thus providing an effectively resistive output termination impedance from each rotor winding. The required phase shift for each rotor winding circuit is provided by a variable capacitor shunted across the resistive termination. In order to prevent harmonic accentuation, separate small resistors are serially-connected with each phase shifting capacitor. Adjustment of the variable capacitors provides the desired phase shift. Adjustment of a variable auto-transformer connected to the phase controlled circuit provides output current amplitude control.

One of the objects of the invention is to provide an improved method of and means for electronically deriving non-linear functions of a variable quantity. Another object of the invention is to provide an improved electronic function generator for deriving currents having magnitudes which are non-linear functions of the magnitude of an applied current and which bear predetermined phase relation to said applied current. A further object of the invention is to provide an improved electronic tracking device and phase correction circuit for converting the values of a variable quantity in polar coordinates to corresponding values of said variable in Cartesian coordinates. An additional object of the invention is to provide an improved variocoupler and output phase and amplitude adjusting circuit for converting an energizing alternating potential to other potentials corresponding in magnitudes to the sine and cosine of the magnitude of the energizing potential with respect to the angular displacement of the rotating element of the variocoupler.

Another object is to provide an improved method of and means for adjusting the relative phases and amplitudes of output currents derived from a non-linear function generator excited by alternating currents. A further object is to provide means for neutralizing the reactance in the output circuit of an inductive non-linear function generator and means for adjusting the relative phases and amplitudes of a plurality of said neutralized output circuits.

Figure 2:
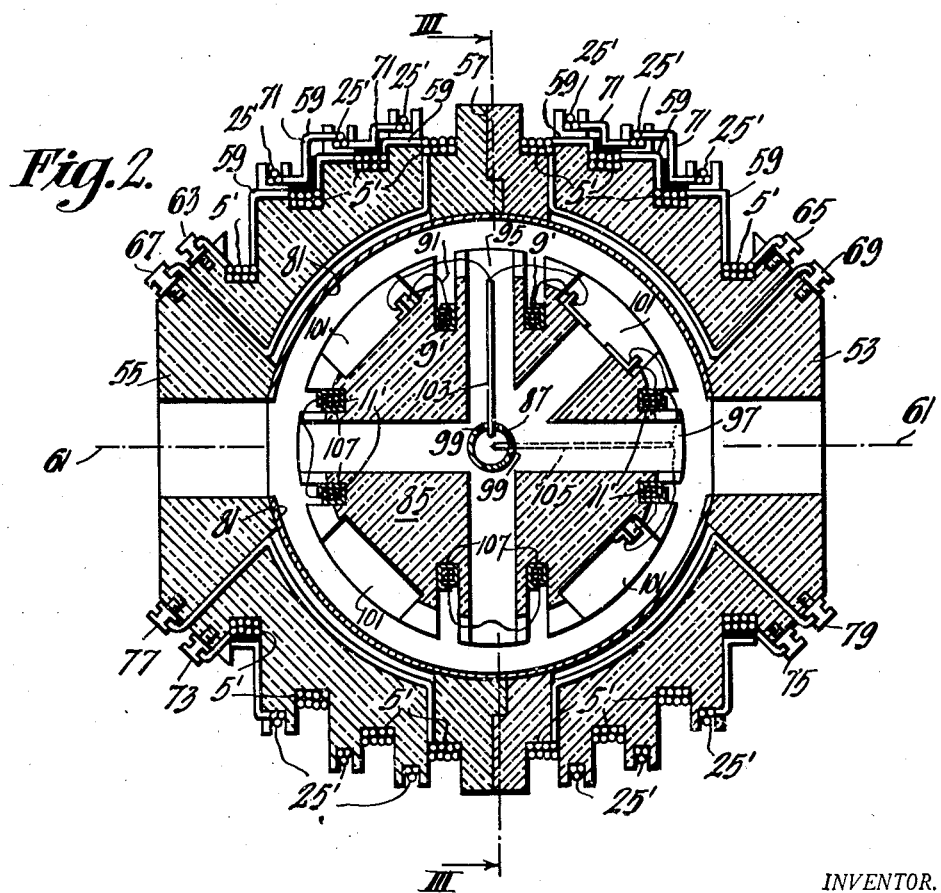
Figure 3:
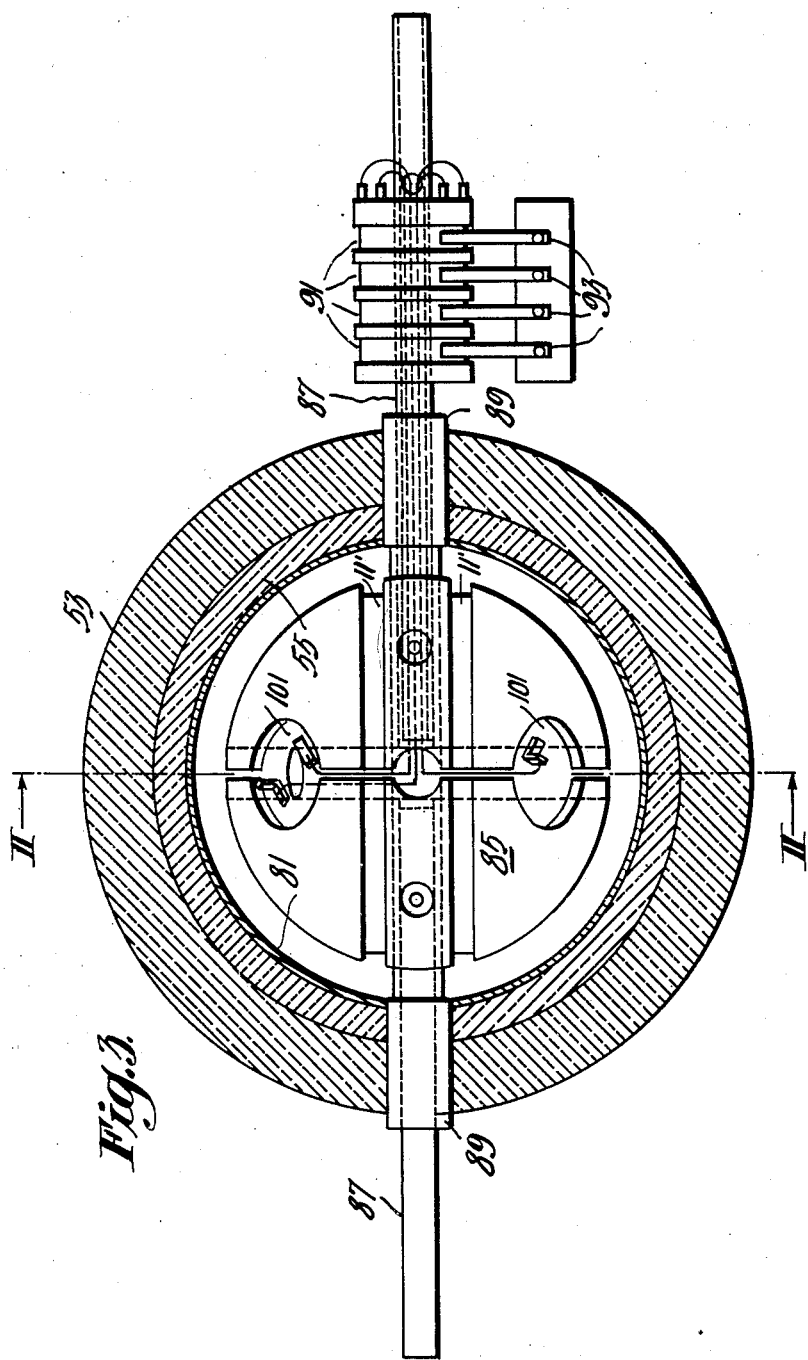

The invention will be described in greater detail by reference to the accompanying drawing of which Figure 1 is a schematic circuit diagram of a preferred embodiment thereof, Figure 2 is an elevational cross-sectional view taken along the line II—II, and Figure 3 is a side elevational view of a preferred embodiment of a variocoupler comprising an essential element of the network schematically shown in Figure 1. Similar reference characters are applied to similar elements throughout the drawing.

Referring to the circuit of Figure 1, input signals having a frequency, for example, of 2500 C. P. S., are applied to the input terminals 1, 3 which are connected to the stator winding 5 of a variocoupler 7 of the type generally described heretofore. The variocoupler 7 includes a pair of mutually perpendicular rotor windings 9, 11, which are continuously and simultaneously rotatable within the uniformly distributed magnetic field produced by energization of the stator windings. The first rotor winding 9 is coupled through a first amplitude and phase adjusting circuit 13 to output terminals 15, 17, which provide currents proportional in magnitude to the sine of the magnitudes of the input current. The second rotor winding 11 is coupled through a second amplitude and phase adjusting circuit 19 to other output terminals 21, 23, for deriving currents of magnitude proportional to the cosine of the magnitude of the input signal currents.

A feedback winding 25 fixedly supported with respect to the stator winding 9 generates a feedback current which is utilized as described in said copending Vance application for inserting in series with the input voltage a voltage in phase opposition to and but of slightly lower magnitude than said input voltage. The magnitude of the energizing field generated by the stator winding 5 thus is substantially determined by the magnitude of said input voltage applied to the input terminals 1 and 3 and is substantially independent of variations in the gain of the input circuit and of the resistance of the field and feedback variocoupler windings 5 and 25. It should be understood that the strength of the feedback voltage may be controlled by the number of turns on the feedback winding, and that the energizing field intensity and stability may be controlled by an adjustment of the phase and amplitude of the feedback current.

Since it is desirable that the output currents derived from the output terminals 15, 17 and 21, 23 shall be true trigonometric functions of the magnitudes of the currents energizing the stator winding 5, it is essential that capacitive coupling between the various windings of the variocoupler be substantially eliminated since such capacitive coupling would provide fictitious output currents from the rotor windings and would also permit undesirable reaction between the output circuits. To overcome such capacitive coupling between the several windings of the variocoupler, electrostatic shields indicated by the dash line 27 are interposed between the various windings and are effectively grounded.

The phase and amplitude control circuit 13 for the first rotor winding 9 comprises a first series capacitor 29 for resonating the rotor reactance to provide an effectively resistive termination therefor at the operating frequency. A first variable capacitor 31 and a first series resistor 33, of low valve, are shunted across the resistive termination to provide the desired phase shift. The series resistor is included to prevent high harmonic accentuation. Output current amplitude control is provided by a first tapped auto-transformer 35 having the phase-controlled resistive termination of the rotor winding connected between one end terminal and an intermediate fixed terminal 37 of said transformer. The output terminals 15, 17 are connected, respectively, to an adjustable tap 39 and said end terminal of said transformer.

The phase and output current amplitude of of the currents derived from the second rotor winding 11 are similarly controlled by a second series capacitor 41, a second variable capacitor 43 and series resistor 45, and by a second tapped auto-transformer 47. The second pair of output terminals 21, 23 are connected, respectively, to a movable tap 49 and to one terminal of said second transformer.

Referring to Figures 2 and 3, a preferred embodiment of an accurately aligned variocoupler comprising an essential component of the function generator circuit shown in Figure 1 includes a pair of substantially hemispherical stator insulating supports 53 and 55 which may be telescoped together at the joint 57. The external surface of the stator sections include peripheral slots for supporting a plurality of sections 5' of the stator winding 5. The stator sections 5' are wound with insulating conductors and are serially-connected by means of jumpers 59 between adjacent winding sections. The numbers of turns on each coil section, and the spacing between adjacent coil sections, are arranged to provide a constant winding density along the axis 61 of the coil to produce an electromagnetic field having substantially uniform intensity. The serially-connected stator winding sections 5' are terminated in a pair of input terminals 63, 65. The ends of the serially-connected stator winding 5' on each of the hemispherical stator supports 53, 55 are terminated in additional terminals 67, 69 which may be connected together by means of a jumper lead, not shown, after the variocoupler is assembled.

The feedback winding 25 comprises a plurality of small winding sections 25' which are similarly connected together by jumpers 71 on each of the stator supports. The feedback winding sections 25' each comprise relatively few turns supported in other peripheral slots disposed intermediate the stator winding sections 5'. The output terminals 73, 75 of the feedback winding provide for connection to the feedback circuit, and the two halves of the feedback winding are terminated in terminals 77 and 79 which are connected together by means of a jumper lead, not shown, after the variocoupler is assembled. The internal surfaces of the stator supports 53 and 55 are coated by means of a conducting shield 81 which may be grounded in any well known manner. The conductive electrostatic shield 81 may comprise, for example a coating of carbonaceous material applied in fluid form and permitted to solidify.

The rotor windings are supported on a substantially spherical insulating support 85 which is rotatable with a rotor shaft 87 journalled in suitable bearings 89 mounted on the stator support. The rotor shaft 87 preferably is hollow in order that the rotor winding terminal leads may be conveniently brought out to conventional slip rings 91 and contacts 93 or other rotor terminals. The rotor support 85 includes a pair of perpendicularly disposed radial channels 95, 97 for the output terminal leads from the rotor windings. The hollow rotor shaft 87 includes suitable apertures 99 in the periphery thereof for permitting the rotor winding leads to be brought through the hollow shaft.

The rotor windings 9' and 11' are wound in mutually perpendicular pairs of peripheral slots in the rotor support 85, and terminated in suitable terminals set into shallow depressions 101 in the rotor support. The rotor winding terminals are connected by means of pairs of flexible insulating leads 103 and 105 which pass through the channels 95 and 97 and through the center of the hollow rotor shaft 87, to the external terminating means. The individual rotor coil sections 9' and 11' include individual electrostatic shields 107 which may comprise, for example, a thin layer of metallic foil surrounding each of the winding sections. The several rotor coil shields may be connected together and grounded to the rotor shaft in any conventional manner. The stator and feedback windings and the rotor support including the slots for the perpendicularly disposed rotor windings should be as accurately aligned as possible. The rotor shaft 87 also should be accurately aligned with one of the center axes of the stator in order that output currents derived from the rotor windings may substantially approximate true trigonometric functions of the energizing current applied to the stator winding.

The stator supports 53, 55 preferably should telescope closely and should be cemented or otherwise held together after assembling. The stator sphere may be supported by projecting pins or brackets 109 fastened to the outer supporting shield 111 and journalled into the openings 113, 115 on the stator axis 61.

Thus the invention disclosed and claimed herein comprises a circuit for controlling the phases and amplitudes of the currents derived from the normally-disposed rotor windings of a precision type variocoupler having its stator windings excited by alternating potentials. The phase and amplitude controls for each rotor winding operate substantially independently to provide accurately-phased sine and cosine function currents having the desired scale factors.

I claim as my invention:

1. Apparatus for deriving currents having instantaneous amplitudes equal to a non-linear function of the instantaneous amplitudes of applied currents including means responsive to said applied currents for establishing a substantially uniform alternating magnetic field, inductive means selectively rotatable through a predetermined angle within said field for deriving output currents having amplitudes approximately proportional to said function of said angle, capacitive means for resonating said inductive means to the frequency of said applied currents to provide a resistive termination for said output currents, a phase shifter connected to said resistive termination for adjusting the phase of said output currents and means for adjusting the magnitude of said output currents.

2. Apparatus for deriving currents having instantaneous amplitudes equal to a non-linear function of the instantaneous amplitudes of applied currents including means responsive to said applied currents for establishing a substantially uniform alternating magnetic field, inductive means selectively rotatable through a predetermined angle within said field for deriving output currents having amplitudes proportional to the density of said field and approximately proportional to said function of said angle, a series capacitor for resonating said inductive means to the frequency of said applied currents to provide a resistive termination for said output currents, a capacitive phase shifter in shunt with said resistive termination for adjusting the phase of said output currents and means for adjusting the magnitude of said phase adjusted ouput currents.

3. Apparatus according to claim 2 including a resistor serially-connected with said phase shifter to prevent harmonic accentuation due to series resonance of said inductive means and said phase shifter.

4. Apparatus for deriving currents having instantaneous amplitudes equal to a non-linear function of the instantaneous amplitudes of applied currents including a first winding having connections for said applied currents for establishing a substantially uniform alternating magnetic field, a second winding selectively rotatable through a predetermined angle within said field for deriving output currents having amplitudes proportional to the density of said field and approximately proportional to the sine of said angle, a series capacitor for resonating said second winding to the frequency of said applied currents to provide a resistive termination for said output currents, a resistive-capacitive phase shifter in shunt with said resistive termination for adjusting the phase of said output currents and voltage adjusting means for said phase adjusted output currents.

5. Apparatus for deriving currents having instantaneous amplitudes equal to a non-linear function of the instantaneous amplitudes of applied currents including a first winding having connections for said applied currents for establishing a substantially uniform alternating magnetic field, a second winding selectively rotatable through a predetermined angle within said field for deriving first output currents having amplitudes proportional to the density of said field and approximately proportional to the sine of said angle, a third winding normally disposed with respect to and rotatable with said second winding and coupled to said field for deriving second output currents proportional in amplitude to said density of said field and approximately proportional to the cosine of said angle, series capacitors for resonating each of said second and third windings to the frequency of said applied currents to provide resistive terminations for said output currents, a resistive-capacitive phase shifter in shunt with each of said resistive terminations for adjusting the phases of said output currents and voltage adjusting means for each of said phase adjusted output currents.

6. Apparatus according to claim 5 wherein said voltage adjusting means comprises an adjustable transformer shunt connected with said phase shifter.

MAURICE LEIGHTON GREENOUGH.

REFERENCES CITED

The following references are of record in the file of this patent:

UNITED STATES PATENTS

| Number | Name | Date |
| --- | --- | --- |
| 2,256,538 | Alford | Sept. 23, 1941 |